Aug. 9, 1966 G. B. LUCAS 3,265,538
MULTIPLE VENT PLUG ASSEMBLY
Filed Dec. 19, 1962 2 Sheets-Sheet 2
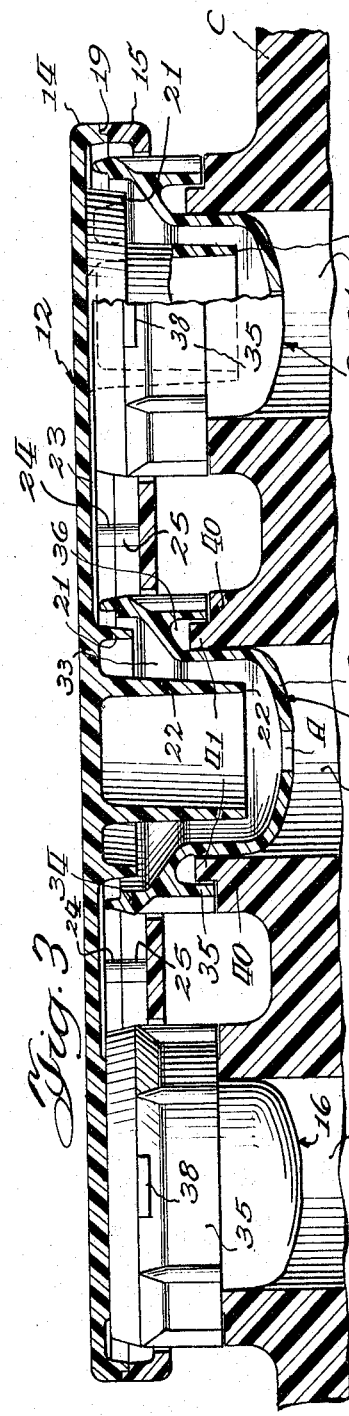
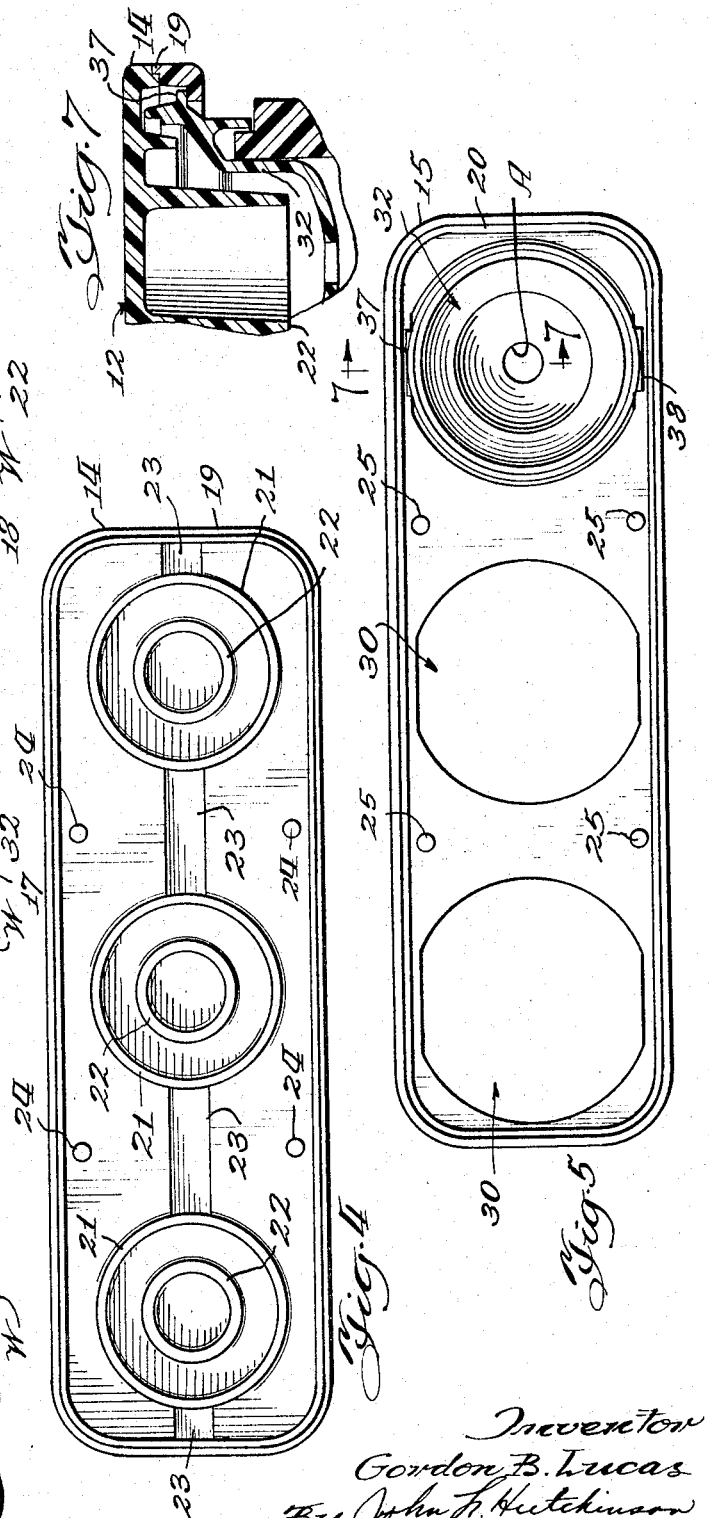
Inventor
Gordon B. Lucas
By John F. Hutchinson
attorney United States Patent Office 3,265,538
Patented August 9, 1966

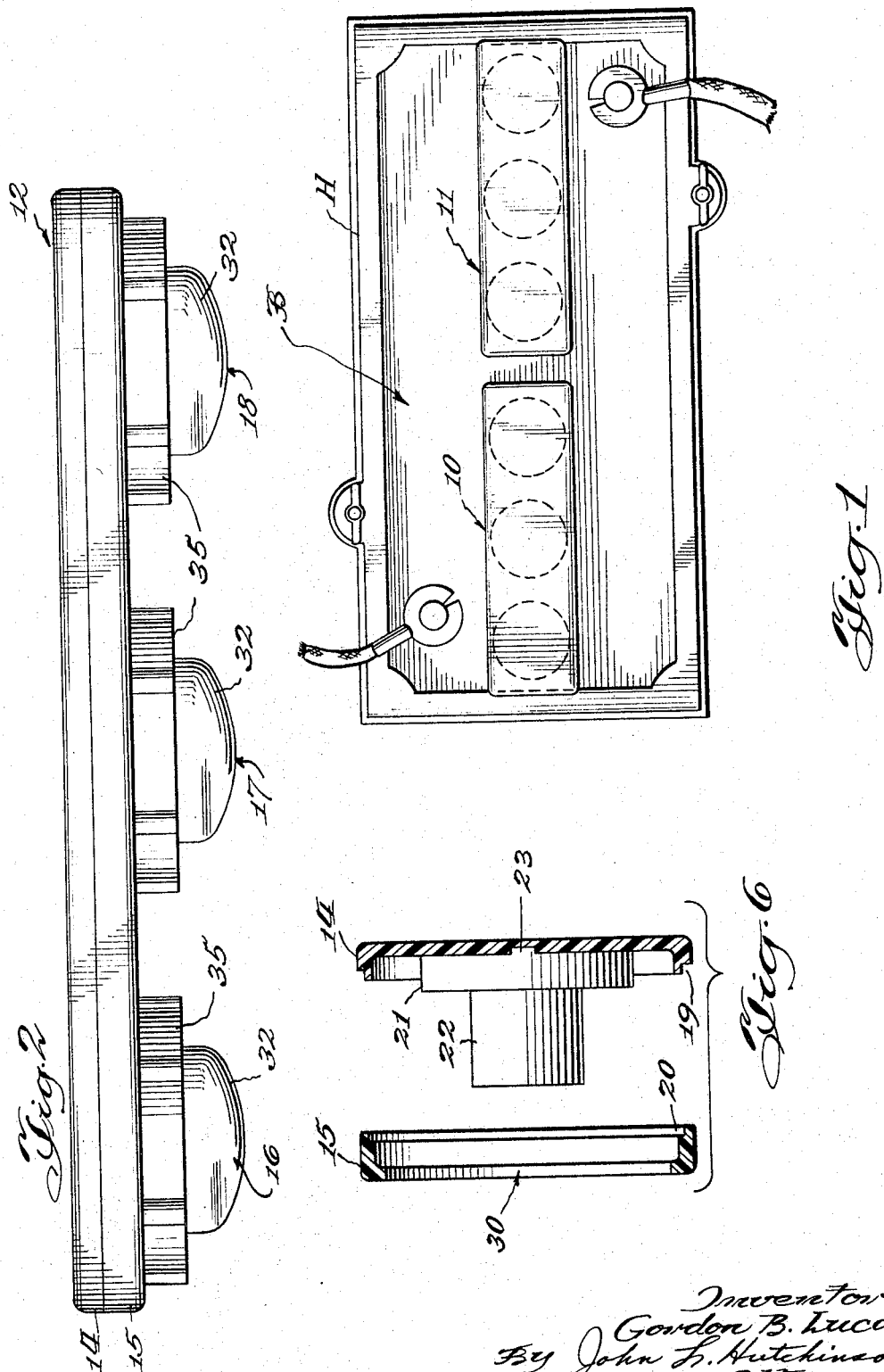

3,265,538
MULTIPLE VENT PLUG ASSEMBLY
Gordon B. Lucas, River Forest, Ill., assignor to The Richardson Company, Melrose Park, Ill., a corporation of Ohio
Filed Dec. 19, 1962, Ser. No. 245,815
5 Claims. (Cl. 136—177)

The present invention is concerned with vent plugs of the type used for closing filling wells of electrical batteries and, more particularly, to a new and improved multiple vent plug assembly adapted to serve a plurality of battery filling wells.

The usual electrical storage battery is made from a multiple compartment case and comprises a plurality of individual cells. Each cell contains electrolyte, lead plates and associated connecting elements between cells. Individual covers may be used for each cell or, alternately, a single cover may be employed which is adapted to extend over all cells. Either type of cover is provided with an opening over each cell, sometimes referred to as a filling well, which is provided for the purpose of permitting the addition of electrolyte or distilled water to each cell. Normally, each filling well is provided with a stopper or plug to prevent inadvertent splashing, spilling or discharge of electrolyte from the cell. Due to the fact that the chemical reactions occurring in the cells result in the formation of gases, each filling well stopper or plug must be provided with means for venting the gases to the atmosphere. Accordingly, the plugs are generally formed as hollow stoppers with small openings in their top and bottom.

Frequently, the vent plugs of a battery must be removed for the purpose of inspecting the cell and adding electrolyte or distilled water. When the cells are inspected it is necessary to individually remove and replace each vent plug. This is somewhat tedious and may at times result in temporarily misplacing of one or more of the relatively small vent plugs while attending to the cells.

It is a primary object of the present invention to provide a multiple vent plug assembly whereby a plurality of vent plugs may be simultaneously removed and replaced.

Another object is to provide a vent plug assembly of the above type which provides the normal protection from inadvertent discharge of electrolyte from a cell while permitting egress of gases from the cell.

A further object is the provision of a multiple vent plug assembly whose manufacture is adaptable to volume production at competitive cost.

These and other objects will become more apparent from the drawings and further detailed description presented hereinafter.

In the drawings:
FIGURE 1 is a plan view of an electrical storage battery having six cells and provided with two multiple vent plug assemblies adapted to serve three cells each.
FIGURE 2 is a side elevation of the multiple vent plug assembly illustrating its basic components assembled as a single integral unit.
FIGURE 3 is an elevation, partly in cross section, showing the multiple vent plug assembly installed with its associated vent plugs in position in the filling wells of a battery.
FIGURE 4 is a plan view of the underside of the top section of the assembly.
FIGURE 5 is a plan view of the bottom section of the assembly showing a plug base in position.
FIGURE 6 is an end elevation, partly in cross section, of the top and bottom sections of the assembly.
FIGURE 7 is a further partial view, in cross section, of the assembly installed in a cover, wherein the views of lower section of the assembled body and plug are taken along line 7—7 of FIGURE 5.

Turning now to the drawings for a more detailed description of the invention and initially to FIGURE 1, the letter B indicates generally an electrical storage battery such as may be used, for example, in an automobile. Normally, when installed in a vehicle, such batteries are provided with a holddown bracket H.

As illustrated, the storage battery of FIGURE 1 contains six cells. Two multiple vent plug assemblies 10 and 11 of the type contemplated herein are shown in place, each adapted to close three cells.

An enlarged vent plug assembly is illustrated in FIGURES 2 and 3. The assembly includes an elongated hollow body 12 formed by permanently uniting complementary top and bottom sections 14 and 15, respectively. Suspended from within body 12 are a plurality of vent plugs, indicated generally by the numerals 16, 17 and 18. In order to insure adequate seating of the plugs of each assembly within their respective filling wells, the plugs are not rigidly attached to the elongated body 12 but, rather, are suspended therein, as will be further described, in such a manner as to permit a limited amount of movement, particularly with respect to the longitudinal axis of the elongated body 12.

The two sections which are joined to form the elongated body 12 are best illustrated in FIGURES 4, 5 and 6. Both of sections 14 and 15 are provided with peripheral flanges as shown. The flange of top section 14 includes an outer recess 19 whereas the flange of bottom section 15 includes an inner recess 20. The presence of these two complementary recesses permits an interfit and proper alignment of the two sections when assembled. Any alternate appropriate means, such as a tongue and groove design, etc., may also be used to facilitate forming an integral assembly of the two sections. Normally, the two sections are permanently joned by adhesive. In addition, intermediate of the edges of the top and bottom sections 14 and 15 are provided a plurality of projections 24 and 25, respectively, which support and maintain the inner areas of the two sections in the desired spaced relationship when assembled.

Top section 14 of body 12 is also provided with a series of two concentrically disposed cylindrical skirts 21 and 22 depending from the underside of the section. The outer cylindrical skirt 21, as shown, is considerably shorter than the inner cylindrical skirt 22. The longer skirt 22 extends downwardly through openings in the lower section and into hollow vent plugs as hereinafter described and, in combination with the shorter skirt, serves as a baffle to prevent inadvertent discharge of electrolyte while permitting egress of gases from the battery cells.

As indicated, the lower or bottom section 15 of the body 12 is formed with a series of openings 30 corresponding in number to the number of vent plugs to be included within the assembly. Each opening is aligned with one pair of concentric cylindrical skirts associated with top section 14 and described above.

Top section 14 is further provided with a longitudinal recess 23 in its undersurface which extends between the shorter cylindrical skirts and also from the edge of the outermost skirts to the ends of the top section.

The third basic component of the assembly comprises the plug body identified generally, as mentioned above, by the numerals 16, 17 and 18 in FIGURES 2 and 3, and more specifically, by the numeral 32 in FIGURES 3 and 5 and 7. The circular bottom of the plug slopes slightly downward toward its center and is provided with a small opening A to permit entrance of gases from a battery cell into the plug for subsequent discharge to the atmosphere, as described hereinafter. As shown, the plug body 32 is cup-like in shape, being provided with a substantially vertical annular wall part way, which is then tapered outwardly into an annularly flared wall section 33 followed by a smaller annular vertical wall section 34. Extending downwardly from the outside of the flared wall section 33 is a skirt 35 which, together with the main plug body, forms an annular recess 36.

Each plug body is also provided with two rectangular lugs 37 and 38 extending laterally from the upper periphery whose function is to support the plug body within the assembly and prevent the plug body from rotating when in position in the assembly, while permitting some movement longitudinally of the assembly.

The letter C in FIGURE 3 designates the cover of a battery which is provided with a plurality of circular filling wells W. Each filling well W is defined by a cylindrical projection 40 extending above the upper surface of the cover C. Each projection 40 is additionally provided with a further upwardly extending annular projection 41. As can be seen in FIGURE 3, when the plug body 32 is inserted into a filling well W, circular projection 41 is simultaneously forced into annular recess 36 thereby helping to properly seat and locate the plug body as well as provide additional seal against inadvertent egress of electrolyte.

To assemble the various components the appropriate number of vent plug bodies 32 are initially inserted into the openings 30 of the lower section 15 of the body 12. In this position the plug body 32 is held within opening 30 by means of lugs 37 and 38 with the major part of the plug body being exposed below section 15. Actually, the plug body 32 is somewhat less in diameter than the diameter of opening 30 to permit some relative movement of the plug body within the opening. The lugs 37 and 38 are rectangular and extend substantially to the flange of bottom section 15 thereby preventing any appreciable lateral movement of the plug body in opening 30 but permitting some longitudinal movement.

After the plug bodies have been thus suspended in the openings in lower section 15, the top section 14 is then placed in position on lower section 15. As indicated, the two sections may be permanently joined by use of an adhesive, for example, applied at points of juncture of the two sections. When assembled the undersurface of the top section 14 should rest upon and be in substantial contact with the upper peripheral edge defining the opening of the plug body except where the edge crosses recess 23.

After the multiple vent plug assembly is installed, whereby each plug body is located in a filling well, each filling well is closed to discharge of electrolyte. However, gases which may be created due to chemical reaction may be readily discharged from each cell. Thus, such gases can enter the hollow plug body through opening A, pass upward and around the skirts 22 and 21 and then outwardly from the plug by means of recesses 23 to the atmosphere. The general design of the hollow vent plug body, location of recesses 23, and the presence of the cylindrical skirts 21 and 22, offers substantial obstruction to upward passage of any electrolyte which may find its way into the plug body and, correspondingly, prevents undesired discharge of such electrolyte from the cell. Normally, any electrolyte which may enter the vent plug through opening A will be shortly returned to the cell likewise through opening A due to the slight inward and downward slope of the bottom of the vent plug body surrounding the opening.

It will be seen that, as a result of the design of the above-described assembly, the assembly, when installed in position on a battery, provides open areas between filling wells. Thus, the elongated body 12, as illustrated in the drawings, extends between and is connected to its associated vent plugs near their upper periphery. However, in the area between filling wells, the elongated body is spaced above the top surface of the battery cover. The presence of the openings created between the filling wells beneath the elongated body is sufficient to permit insertion of the fingers of an operator's hand, thereby enabling easy removal of the vent plug assembly, when required, by an upward pull.

Any number of vent plugs may thus be combined in a single assembly. Two assemblies provided with three vent plugs each are shown in the drawings for a six cell battery. An operator is, accordingly, able to remove three plugs at a time and thus uncover three battery cell filling wells simultaneously for inspection and service.

In general, all three of the basic components of the assembly, namely, the top section, bottom section and vent plug body may be molded, by an injection molding process for example, using any one of a wide variety of plastic compositions which may be available, thereby enabling volume production at competitive cost. Assembly of the components likewise lends itself to a relatively simple and rapid operation involving substantially a minimum of expense.

I claim:

1. A multiple vent plug assembly for closing a plurality of filling wells of electrical storage batteries, the batteries being provided with covers having upwardly extending projections around the filling wells, said plug assembly comprising an elongated hollow body composed of a top and bottom section permanently joined as an integral unit, the bottom section being provided with a plurality of openings at spaced intervals between the ends thereof, a hollow vent plug suspended in each of said openings and extending below said body and having an aperture in the bottom thereof, means provided near the top of the vent plug for establishing communication between the interior of the vent plugs and the interior of said body, the upper wall of each vent plug being flared outwardly, a skirt depending from the external underside of the flared wall and encircling the outside of the vent plug forming an annular recess therewith, said skirt being adapted to seat around the upwardly extending projection of each filling well to provide additional seal against inadvertent egress of electrolyte, and a plurality of longitudinally spaced cylindrical skirts formed integrally with and depending from the underside of the top section of said elongated hollow body, one such skirt extending downwardly through an opening into each hollow vent plug, and means for establishing communication between the exterior and interior of said elongated hollow body whereby said vent plug assembly will permit egress of gas from battery cells to the atmosphere while offering obstruction to discharge of electrolyte from such cells.

2. A multiple vent plug assembly as described in claim 1 including a second cylindrical skirt of shortened length depending from said top section concentrically disposed in spaced relationship about each of said first-named cylindrical skirts and extending into said hollow vent plug.

3. A multiple vent plug assembly as described in claim 1 wherein the means for establishing communication between the interior of the vent plugs and the interior of the hollow body comprises a recess in the underside of the top section of said hollow body, said recess being adjacent to the upper wall of the vent plug, and extending in a longitudinal direction to at least one end of said top section.

4. A multiple vent plug assembly as described in claim 3 wherein each of the vent plugs are slightly smaller than their respective openings to be capable of limited longitudinal movement, to provide adequate seating of each plug within their respective filling wells, and also to provide the means for establishing communication between the exterior and interior of said elongated hollow body.

5. A multiple vent plug assembly as described in claim 4 wherein the upper edge of each vent plug is provided with two laterally extending lugs adapted to support the vent plug in its respective opening and in cooperation with the inner side of said hollow body simultaneously prevent rotation of said vent plug in said opening.

References Cited by the Examiner
UNITED STATES PATENTS

| | | | |
|---|---|---|---|
| 3,081,373 | 3/1963 | Hughes | 136—177 |
| 3,083,254 | 3/1963 | Slautterback | 136—177 |
| 3,161,548 | 12/1964 | Goldingay | 136—177 |

FOREIGN PATENTS 836,944  6/1960  Great Britain.

WINSTON A. DOUGLAS, *Primary Examiner*.
JOHN H. MACK, *Examiner*.
D. L. WALTON, *Assistant Examiner*.